United States Patent
Nambu et al.

(10) Patent No.: US 6,875,508 B1
(45) Date of Patent: Apr. 5, 2005

(54) FIBER CAPABLE OF FORMING METAL CHELATE, PROCESS FOR PRODUCING THE SAME, METHOD OF TRAPPING METAL ION WITH THE FIBER, AND METAL CHELATE FIBER

(75) Inventors: Nobuyoshi Nambu, Yokkaichi (JP); Osamu Ito, Yokkaichi (JP); Shiho Horiuchi, Osaka (JP); Takao Doi, Yokkaichi (JP)

(73) Assignees: Chelest Corporation, Osaka (JP); Chubu Chelest Co., Ltd., Osaka (JP)

(*) Notice: Subject to any disclaimer, the term of this patent is extended or adjusted under 35 U.S.C. 154(b) by 0 days.

(21) Appl. No.: 09/914,356

(22) PCT Filed: Feb. 24, 2000

(86) PCT No.: PCT/JP00/01043

§ 371 (c)(1),
(2), (4) Date: Aug. 27, 2001

(87) PCT Pub. No.: WO00/52252

PCT Pub. Date: Sep. 8, 2000

(30) Foreign Application Priority Data

Feb. 26, 1999 (JP) .......................................... 11-050897

(51) Int. Cl.$^7$ .......................... D02G 3/00; D02M 11/00
(52) U.S. Cl. ...................... 428/375; 428/364; 428/394; 428/917; 8/115.51; 8/116.1; 8/181; 8/196
(58) Field of Search .......................... 8/115.51, 116.1, 8/181, 115.54, 115.65, 115.66, 196; 428/375, 394, 917; 424/76.6, 78.1

(56) References Cited

U.S. PATENT DOCUMENTS 6,168,863 B1 * 1/2001 Nambu et al. .............. 428/364

FOREIGN PATENT DOCUMENTS

| EP | 1179627 a1 | * | 2/2002 |
| EP | 1215332 A1 | * | 6/2002 |
| JP | 2-187143 A | | 7/1990 |
| WO | WO98/16680 | * | 4/1998 |
| WO | WO00/52252 | * | 9/2000 |
| WO | WO00/71805 A1 | * | 11/2000 |

OTHER PUBLICATIONS

Waly et al., Synthesis and Characterization of Cellulose Ion Exchanger; Pilot Scale and Utilization in Dye–Heavy Metal Removal, J. Appl. Polym. Sci., 68, No. 13: 2151–2157 (May 27, 1998), The Institute of Paper Science and Technology, Atlanta, GA, US.

* cited by examiner

Primary Examiner—Rena Dye
Assistant Examiner—J. M. Gray
(74) Attorney, Agent, or Firm—Smith Patent Office

(57) ABSTRACT

A fiber capable of forming a metal chelate and a process for producing the same are disclosed, wherein the fiber is characterized in that at least one metal chelate-forming compound selected from the group consisting of aminodicarboxylic acids, aminocarboxylic acids, thiocarboxylic acids and phosphoric acid, which are reactive with a glycidyl group, is bonded to a molecule of a natural fiber or regenerated fiber through a crosslinkable compound having a reactive double bond and a glycidyl group in its molecule. There are also disclosed a method of capturing metal ions using the fiber and a metal chelate fiber which can effectively make use of the characteristics of the metals and can be easily discarded or incinerated.

18 Claims, 4 Drawing Sheets

FIBER CAPABLE OF FORMING METAL CHELATE, PROCESS FOR PRODUCING THE SAME, METHOD OF TRAPPING METAL ION WITH THE FIBER, AND METAL CHELATE FIBER

TECHNICAL FIELD

The present invention relates to a novel metal chelate-forming fiber, a process for producing the same, a method of capturing metal ions with the use of the fiber and a metal chelate fiber. The metal chelate-forming fiber is capable of selectively and efficiently adsorbing metal ions in trace amounts, for example, in water, especially copper, zinc, nickel, cobalt and other harmful heavy metal ions even in a low pH region and can be extensively and effectively used for, for example, the purification of industrial waste water, drinking water and oil. A metal chelate fiber in which the metal chelate-forming fiber and a metal are bonded by chelation can be effectively used, for example, as a variety of catalysts, antimicrobial agents and microbicides, electro-magnetic shielding materials, optical shielding materials, colored clothing and ornaments, fertilizers and metal rust inhibitors, utilizing an activity of the metal chelating with the fiber. This metal chelate fiber can be easily discarded or incinerated.

BACKGROUND ART

A variety of harmful heavy metal ions are contained in some industrial waste water and must be removed by waste water treatment as much as possible in view of the prevention of environmental pollution. Since many of such harmful heavy metal ions can be effectively used, for example, as useful metals, it serves as a double purpose to separate and recover these ions and use these ions effectively as secondary resources.

Ion exchange resins have been widely used for removing harmful heavy metal ions and for capturing useful metal ions contained in, for example, water before or after use. However, the ion exchange resins cannot always have sufficient effects of selectively adsorbing low concentration metal ions.

Chelate resins capable of forming a chelate with metal ions to thereby selectively capture these metal ions have excellent capability of selectively capturing metal ions, especially of caputring heavy metal ions, thus the chelate resins are used to remove or capture heavy metals in the field of water treatment.

However, since most of the chelate resins are bead-like resins having a rigid three-dimensional crosslinked structure formed by action of a crosslinking agent such as divinylbenzene and are hydrophobic, a rate of diffusion and permeation of metal ions or regenerants into the resins is lowered. Thus, treatment efficiency is insufficient. In addition, in the case of disposal of the used resins without being regenerated, problems such as difficulty in incineration and complicated volume reduction of the used resins have been greatly pointed out.

As a possible solution to these problems of bead-like chelatable resins, a fibrous chelate resin has been proposed (e.g., Japanese Patent No. 2,772,010). This fibrous chelate resin has a large specific surface area, includes a chelatable functional group, by which metal ions are adsorbed or desorbed on its surface, and therefore has an improved adsorption and desorption capability.

However, the fibrous chelate resin comprises a polymer of an olefin or halogenated olefin as a base, and invites the formation of dioxins or other harmful gases when it is incinerated. Additionally, a process for producing the fibrous chelate resin, namely modification to impart metal chelating activity to a resin, is complicated and requires a special process using, for example, ionizing radiation, and a number of disadvantages have been pointed out in terms of, for example, facilities, safety, and production cost.

The present invention has been accomplished under these circumstances, and a first object of the present invention is to provide a metal chelate forming fiber that has satisfactory capturing property for harmful heavy metal ions, can be easily discarded and incinerated, moreover, can be produced at low cost in a simple and safe manner. It is a second object of the invention to provide a process for easily, safely, and efficiently producing the metal chelate forming fiber.

A third object of the present invention is to provide a method of easily and efficiently capturing metal ions contained in trace amounts, for example, in an aqueous or oily liquid or in a gas such as an exhaust gas and the like by the use of the metal chelate forming fiber. Additionally, a fourth object of the present invention is to provide a metal chelate fiber which is making use of catalytic activities or antimicrobial activities of a variety of metals by allowing the metals to be bonded by chelation to a surface of the metal chelate forming fiber.

DISCLOSURE OF INVENTION

The present invention has been accomplished to achieve the above objects and provides a metal chelate forming fiber. The subject matter of the present invention is that at least one metal chelate forming compound selected from the group consisting of aminodicarboxylic acids, thiocarboxylic acid and phosphoric acid which are reactive to epoxy group is bonded to a fiber molecule of a natural fiber or regenerated fiber through a graft reaction product of a crosslinkable compound which has a reactive double bond and a glycidyl group in its molecule.

As the crosslinkable compound, typically preferred are glycidyl methacrylate, glycidyl acrylate and allyl glycidyl ether. These compounds can be used individually or in combination of at least two, if it is required.

Preferred examples of the chelate forming compound are iminodiacetic acid, ethylenediaminediacetic acid, ethylenediaminetriacetic acid, thioglycolic acid, thiomalic acid and phosphoric acid. These compounds can also be used individually or in combination of at least two of them appropriately. Of these metal chelate-forming compounds, more preferable are iminodiacetic acid, ethylenediaminetriacetic acid and thioglycolic acid.

The natural or regenerated fiber includes, for example, vegetable fibers such as cellulosic fibers including viscose and other regenerated fibers or animal fibers such as wool and silk. These fibers can be used in the form of a short fibrous powder or as a filter material in the form of a sheet, mat or nonwoven fabric.

The process of the present invention is evaluated as a process for industrially efficiently producing the metal chelate-forming fiber and comprises subjecting a crosslinkable compound having a reactive double bond and a glycidyl group in its molecule to graft polymerization reaction with a fiber molecule of a natural or regenerated fiber with the use of a redox catalyst and allowing the resulting graft reaction product to be additional reacted with at least one metal chelate-forming compound selected from the group consisting of aminodicarboxylic acids, thiocarboxylic acids and phosphoric acid which are reactive with an epoxy group.

Preferred crosslinkable compounds for use in this process are, for example, glycidyl methacrylate, glycidyl acrylate and allyl glycidyl ether. These compounds can be used individually or in combination of at least two of them, if it is necessary. Preferred examples of the metal chelate-forming compound include iminodiacetic acid, ethylenediaminediacetic acid, ethylenediaminetriacetic acid, thioglycolic acid, thiomalic acid and phosphoric acid. These compounds can also be used individually or in combination of at least two of them.

A preferred redox catalyst for use in the production process is a combination of a divalent iron salt, hydrogen peroxide and thiourea dioxide. It is preferable that the natural or regenerated fiber is previously treated with the divalent iron salt and is then applied with the hydrogen peroxide and thiourea dioxide to thereby perform the graft polymerization reaction in the production process. The use of this procedure can allow the natural or regenerated fiber to more efficiently react with the crosslinkable compound and can increase the amount of the resultant introduce metal chelate-forming compound to thereby impart a higher chelating activity to the fiber.

Additionally, a method of capturing metal ions according to the present invention comprises bringing the metal chelate-forming fiber into contact with an aqueous liquid, oily liquid or a gas such as a exhaust gas each containing metal ions to thereby capture the metal ions by chelation from these substances.

Further, the metal chelate-forming fiber is bonded with a metal by chelation to obtain a metal chelate fiber. The resulting metal chelate fiber exhibits, for example, catalytic activities, antimicrobial activities or electromagnetic shielding effects depending on the type of the metal, and is also included within the scope of the present invention.

BEST MODE FOR CARRYING OUT THE INVENTION

Figure 1:
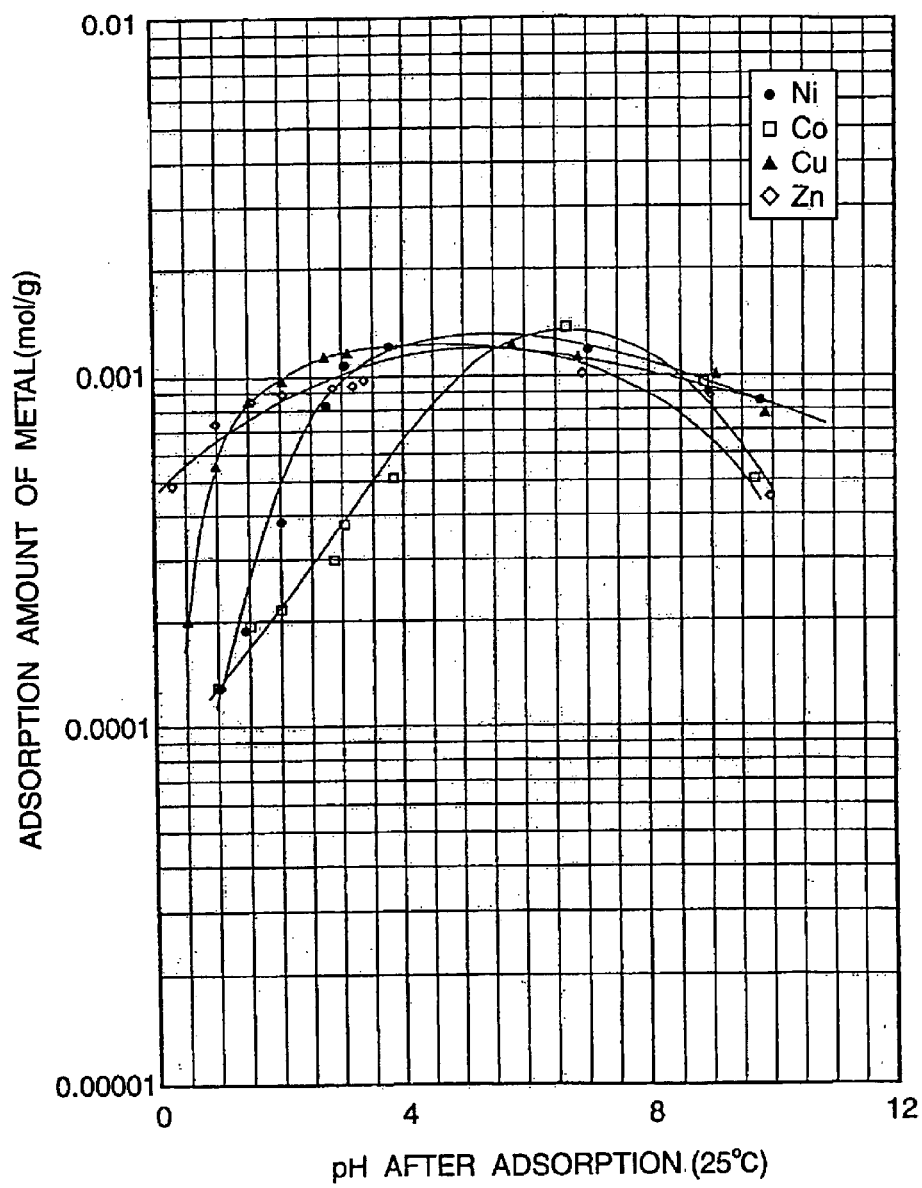
FIG. 1 is a graph showing a relationship between pH of a liquid to be treated and the adsorption of a variety of metal ions upon the use of a chelate fiber A obtained in Example 1.

The metal chelate-forming fiber of the invention comprises a natural or regenerated fiber as a base fiber and is highly wettable with, for example, an aqueous liquid. This is because such natural or regenerated fibers include vegetable fibers such as cellulosic fibers and animal fibers such as silk, wool and the like, and these fibers each have a polar group such as a hydroxyl group or an amino group in the fiber molecule and are hydrophilic.

Additionally, the fiber molecule allows the crosslinkable compound to easily graft onto the fiber molecule by reacting the crosslinkable compound having a double bond and a glycidyl group in its molecule in the presence of a redox catalyst. After the introduction of the crosslinkable compound, the fiber molecule is subjected to reacting with a metal chelate forming compound which is reactive with a glycidyl group to thereby easily impart chelating capability to the fiber molecule. In this procedure, iminodiacetic acid, ethylenediaminediacetic acid, ethylenediaminetriacetic acid, thiogylycolic acid, thiomalic acid or phosphoric acid are used as the preferable chelate forming compound.

Consequently, the natural or regenerated fiber has a multitude of metal chelate forming functional groups introduced onto a surface of its fiber molecule. Nitrogen atoms, sulfur atoms, carboxyl groups or other moieties present in the chelate-forming functional groups satisfactorily exhibit the selective adsorption of copper, zinc, nickel, cobalt and other heavy metal ions. Additionally, since the chelate-forming functional groups are attached to the surface while being grafted to the fiber molecule, and the metal chelate-forming fiber satisfactorily exhibit the selective adsorption of metal ions by action of the chelate-forming functional groups present in the fiber molecule. Furthermore, as the metal chelate-forming fiber comprises a natural or regenerated fiber as a base fiber, the biodegradation is expected when the fiber is discarded, and a harmful gas is hardly generated when it is incinerated.

Natural fibers and regenerated fibers for use as base fibers for the metal chelate-forming fiber of the invention are not specifically limited in their types and include all the fibers such as a variety of other vegetable fibers as well as cotton, hemp and wood; the other regenerated fibers as well as cupra, rayon, polynosic, acetate; and other animal fibers as well as silk and wool.

The base fiber has no special limitation on its shape, and may have the shape of monofilament or multifilament of long fibers, spun yarn of short fibers, woven or knitted fabric produced by weaving or knitting them, or nonwoven fabric. It is also effective to use mixed spinning fibers, composited fibers or woven or knitted fabrics which are produced from two or more types of fibers. In addition, wood pulp, paper, wood pieces, wood chips and sheets can also be used.

To increase contact efficiency with a fluid to be treated, the base fiber is effectively used as a material in the form of a short fibrous powder or a filter.

The powdery short fibrous powder for use herein has a preferable shape of from 0.01 to 5 mm in length, more preferably from 0.03 to 3 mm in length; of from about 1 to about 50 $\mu$m in a monofilament diameter, more preferably from 5 to 30 $\mu$m in a monofilament diameter; and of from about 1 to about 600 in an aspect ratio, more preferably from about 1 to about 100 in an aspect ratio.

The powdery material in the form of a short fiber can be used in such a simple manner that the metal chelate-forming fiber in the form of a short fibrous powder is added to and stirred with an aqueous or oily liquid containing the metal ion and the resulting mixture is subjected to conventional filtration treatment. In this manner, a metal ion contained in a fluid to be treated can be captured efficiently in a short time to purify the fluid.

In some cases, the metal chelate-forming fiber in the form of a short fibrous powder is charged into a column and the like and the fluid to be treated is allowed to pass through them in order to obtain the same effect for capturing metal ions. Alternately, the metal chelate-forming fiber in the form of a short fibrous powder is subjected to a processing such as papermaking after introducing the chelate-forming functional group in the above manner to easily obtain a filter which has a chelate-capturing ability.

Additionally, when the short fibrous powdery chelate-caputuring material obtained in the above manner is allowed to capture copper, silver or another metal having microbicidal activity, the resulting metal chelate fiber can impart antimicrobial activity to, for example, a resin by kneading the same into the resin. Likewise, a metal chelate fiber capturing a metal ion having oxidation-reduction activity is also useful as a catalyst, and a metal chelate fiber capturing, for example, copper or nickel is useful as an electromagnetic shielding material.

The material in the form of a filter does not have a noticeably special structure and can be formed in the same manner as in filters of all known structures in accordance with the application. Such structures include:

1) a structure obtained by forming into a mat having a single- or multi-layer structure made of a woven/knitted or nonwoven fabric having any space between fibers and mounting the mat onto a suitable supporting substrate,
2) a structure obtained by winding a string of a fiber around the outer periphery of a liquid-permeable cylindrical substrate in a twill pattern several times,
3) a structure obtained by folding a woven/knitted fabric or nonwoven sheet made of the aforementioned fiber in a pleated pattern and mounting the resultant to a supporting member, and
4) a bag filter structure obtained by forming a woven or knitted fabric made by the aforementioned fiber into a bag.

When these filter-shaped materials are used, the fiber of the invention can be produced, for example, by the following processes:

a) a process in which the crosslinkable compound is grafted to a filter-shaped fiber material, and the glycidyl group of the crosslinkable compound grafted to the fiber molecule is subjected to addition reaction with a metal chelate-forming compound to thereby introduce metal-chelate-forming functional groups into the fiber, and the resulting fiber is processed into a filter as above, and
b) a process in which the fiber material is processed into a filter and is assembled into a filter device, and the fiber material assembled in the form of a filter in the device is brought into contact with, and subjected to graft polymerization reaction with, a treatment liquid containing the crosslinkable compound and is then brought into contact with a metal chelate-forming compound to thereby subsequently introduce metal chelate-forming functional groups into the fiber material.

In this manner, the introduction of metal chelate-forming functional groups into a filter-shaped fiber material can yield a filter that is both capable of capturing metal ions by action of chelation and capable of capturing insoluble impurities. Accordingly, when a fiber density of the filter is adjusted so as to have an appropriate mesh size in accordance with the sizes of insoluble impurities contained in a liquid or gas to be treated, and the liquid or gas to be treated is allowed to pass through the filter, metal ions contained in the liquid or gas to be treated are captured by the chelate-forming functional group.

Concurrently, insoluble impurities are prevented from passing through the filter by action of the mesh of the filter. Thus, the metal ions and insoluble impurities can be concurrently removed from the liquid or gas.

In this case, a filter having a necessary capability of purification can be obtained by controlling space or gaps between the fibers depending on the particle sizes of insoluble impurities contained in the fluid to be treated. This is because the spaces between the fibers can be optionally controlled by adjusting the size, woven or knitted density, number of lamination layer or density of lamination layer of the chelate-forming fiber used or by adjusting the density of winding, thickness of wound layers or tension of winding when the filter is obtained by winding a string of the chelate-forming fiber several times.

A compound having a reactive double bond and a glycidyl group in its molecule is used as the crosslinkable compound to fix the metal chelate-forming functional groups to the base fiber in the production of the metal chelate-forming fiber of the invention. The crosslinkable compound is brought into contact with the base fiber in the presence of a redox catalyst as mentioned later to thereby allow the reactive double bond to react with the fiber molecule, and a group having a glycidyl group as a reactive functional group is grafted and added in the form of a pendant to the fiber molecule.

Next, the resulting graft-adduct is allowed to react with a metal chelate-forming compound having a functional group reactive with a glycidyl group, and the reactive functional group reacts with the glycidyl group of the graft-added crosslinkable compound to thereby introduce metal chelate-forming functional groups into the fiber molecule.

Any of compounds can be used as the crosslinkable compound as long as it has both a reactive double bond and a glycidyl group in a its molecule to ensure the reaction with the metal chelate-forming compound in addition to having graft-addition reactivity with the fiber molecule. Among them, typically preferred compounds are glycidyl methacrylate, glycidyl acrylate and allyl glycidyl ether, since they can be more efficiently grafted and added to a natural or regenerated base fiber and can efficiently perform the subsequent introduction reaction of the metal chelate-forming compound. Of these compounds, the most preferred compound is glycidyl methacrylate in view of, for example, its easiness of introduction into the fiber molecule or its availability.

The metal chelate-forming compound includes aminodicarboxylic acids, thiocarboxylic acids and phosphoric acid each being reactive with a glycidyl group. These compounds are highly reactive with a glycidyl group and react, in an almost equimolar amount, with the glycidyl group of the crosslinkable compound introduced into the fiber molecule. Additionally, the compounds are highly capable of chelating with metal ions, and the use of the compounds can efficiently introduce the metal chelate-forming functional group into the fiber molecule with a high reaction rate.

Among these metal chelate-forming compounds, preferred compounds are iminodiacetic acid, ethylenediaminediacetic acid, ethylenediaminetriacetic acid, thioglycolic acid, thiomalic acid and phosphoric acid, in comprehensive view of reaction efficiency, chelate-capturing capability, availability of a material, cost and other factors. Among them, iminodiacetic acid, ethylenediaminetriacetic acid and thioglycolic acid are typically preferred.

Next, a process of the present invention for producing a metal chelate-forming fiber is evaluated as a process that can efficiently and easily introduce a metal chelate-forming compound into a molecule of a natural or regenerated fiber through a crosslinkable compound as mentioned above. As the process of the invention, a process is employed in which the crosslinkable compound is subjected to graft-reaction with the fiber molecule using a redox catalyst and the resulting reaction product is subjected to addition reaction with the chelate-forming compound.

Such redox catalysts include hydrogen peroxide, benzoyl peroxide and cumene hydroperoxide each serving as an oxidizing agent; and divalent iron salts, thiourea dioxide, chromium ion, sulfites, hydroxylamine and hydrazine each serving as a reducing agent, of which a combination of hydrogen peroxide, a divalent iron salt and thiourea dioxide is the most preferred combination in order to subject the crosslinkable compound efficiently to graft reaction with the fiber molecule.

As a concrete process for enhancing the efficiency of the graft reaction to the molecule of the natural or regenerated fiber, it is preferable to treat the fiber with a divalent iron salt previously and then apply hydrogen peroxide and thiourea dioxide. The use of this procedure can yield a high graft-reaction rate by a short-time treatment even under relatively mild conditions, thus this procedure is preferable.

An example of the graft reaction of the crosslinkable compound with a natural fiber by the use of the combination of hydrogen peroxide, a divalent iron salt and thiourea dioxide will be illustrated below:

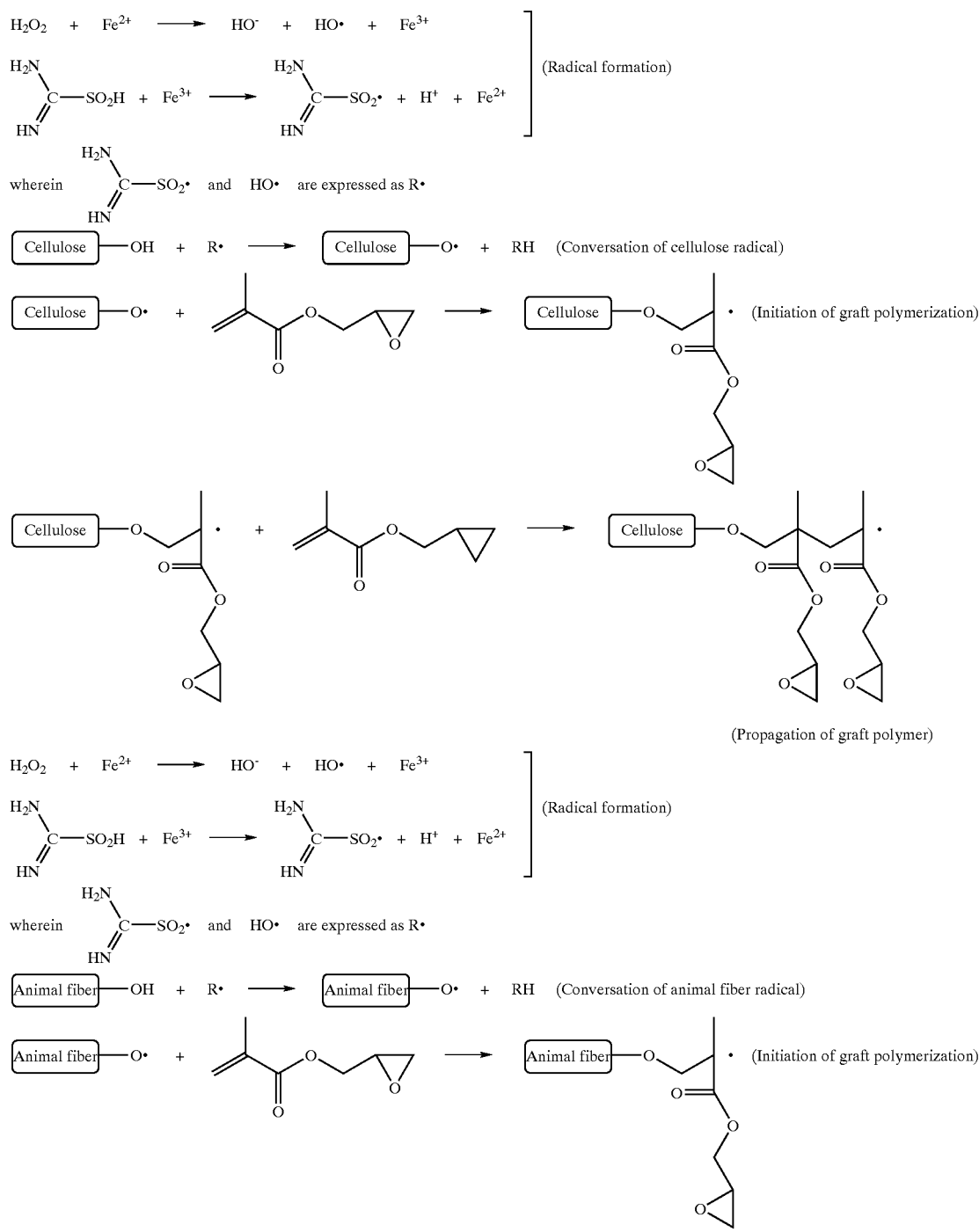

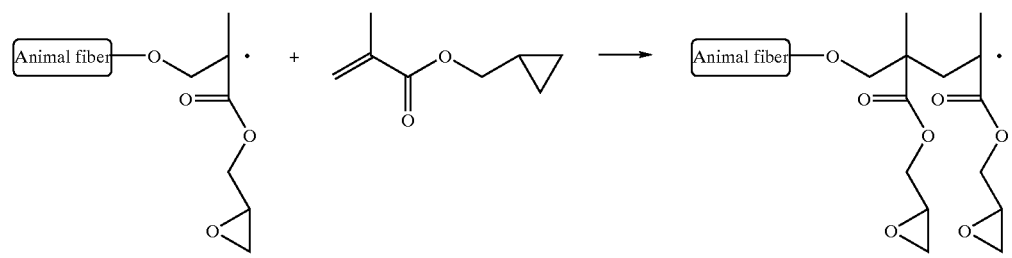
(Propagation of graft polymer)
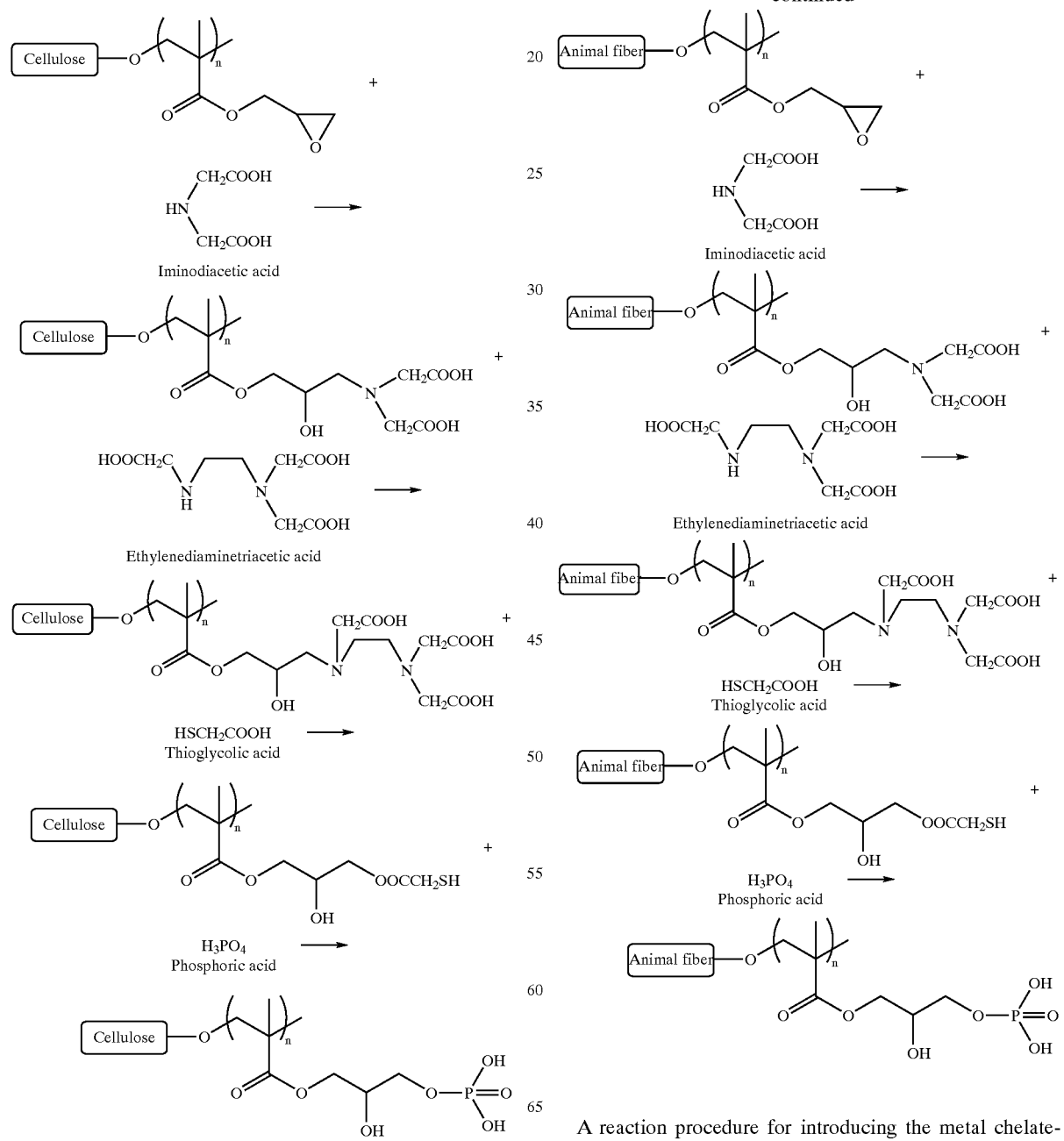
A reaction procedure for introducing the metal chelate-forming functional group into a molecule of a natural fiber using the crosslinkable compound is not specifically limited, but a preferred procedure is as follows:

Specifically, in the preferred process, the natural or regenerated fiber is immersed in an aqueous solution of a divalent iron salt at room temperature for from about 1 to about 30 minutes, is then rinsed, is immersed in an aqueous solution containing an aqueous hydrogen peroxide solution, thiourea dioxide and the crosslinkable compound (where necessary, with a homogeneous-reaction accelerator such as an emulsifying agent) and is allowed to react at 40° C. to 100° C. for from about 10 minutes to about 5 hours.

This procedure can allow the crosslinkable compound to efficiently graft-react with a hydroxyl group or an amino group in the fiber molecule to thereby efficiently introduce a glycidyl group that can easily react with the metal chelate-forming compound into the fiber molecule.

Next, the fiber containing the glycidyl group introduced by the above reaction is allowed to react with the chelate forming compound in a polar solvent such as water, N,N-dimethylformamide or dimethyl sulfoxide and, where necessary, using a reaction solvent at 50° C. to 100° C. for from 10 minutes to several ten hours. By this procedure, an amino group or acid group in the metal chelate-forming compound reacts with the glycidyl group to thereby introduce the metal chelate forming functional group into the fiber molecule.

The amount of the introduced metal chelate-forming compound with respect to the natural or regenerated fiber can be optionally controlled in view of the amount of the reactive functional group in the fiber molecule by changing the amount of the crosslinkable compound for use in the introduction reaction, the amount of the metal chelate-forming compound or reaction conditions. To impart sufficient capability of capturing metal ions to the fiber, the amount of the metal chelate-forming compound is preferably controlled such that a substitution rate calculated according to the following equation is equal to or more than about 10% by mass, more preferably equal to or more than about 20% by mass:

Substitution rate (% by mass)={([(Mass of the fiber after introduction of substituent)−(Mass of the fiber before introduction of substituent)]/(Mass of the fiber before introduction of substituent)}×100

(wherein the term "substituent" means all the substituents derived and introduced from the crosslinkable compound and the metal chelate-forming compound.)

The higher the substitution rate is, the more preferable it is to increase the capability of capturing metal ions, and an upper limit of the substitution rate is not especially specified. However, an excessively high substitution rate tends to invite a higher crystallinity of the fiber containing the introduced substituent to thereby weaken the fiber and tends to invite an increased pressure loss when the fiber is used, for example, as a filter medium or filter for capturing metal ions. Consequently, in comprehensive view of, for example, practical utility and of cost performance as a metal ion capturing material, the upper limit of the substitution rate is preferably about 200% by mass, more preferably 100% by mass. However, the metal ion capturing capability can be increased by employing a high level substitution rate of from about 150% to about 200% by mass in some types or shapes of the natural fiber, some types of the crosslinkable compound or of the chelate-forming compound or in some applications.

The above-obtained metal chelate forming fiber can be obtained in any form such as of a monofilament, multifilament, spun yarn, nonwoven fabric, fibrous woven or knitted fabric, powder or filter depending on the properties of the base fiber used as mentioned above. Since, in all cases, substantially all the metal chelate forming functional groups introduced into a surface of the thin fiber molecule can effectively exhibit the capability of capturing he metal ions, and the resulting metal chelate forming fiber can very satisfactorily exhibit the capability of capturing the metal ions as compared with capturing materials in the form of, for example, a granule or of a film.

Additionally, since this fiber is excellent in the selective adsorption of metal ions, this fiber can capture a target metal selectively by appropriately changing pH and other conditions of a fluid to be treated.

Therefore, this fiber can efficiently capture and remove a metal ion contained in water, oil or exhaust gas to be treated or can selectively capture a specific metal ion by bringing the fiber into contact with the liquid or gas containing metal ions and, more specifically, by laminating the fiber to an optional thickness or filling a column with the fiber and allowing the liquid or gas to be treated to pass through the fiber.

In addition, when the fiber capturing a metal ion in the above manner is treated with an aqueous solution of a strong acid such as hydrochloric acid or sulfuric acid, the metal ion captured by forming chelate can be easily desorbed. By using this property, a metal component can be recovered as a useful component from a regenerated liquid.

Furthermore, the metal chelate forming fiber of the invention can also be used for a metal chelate fiber. The metal chelate fiber comprises a metal which has a specific activity and captured by the metal chelate-forming fiber. The metal chelate fiber utilizes the specific activity of the metal and, for example, can be effectively used in the following various configurations:

① a metal having catalytic activity such as iron is chelate-captured, and the resulting metal chelate fiber is used as a redox reagent (e.g., a catalyst for the removal of NOx or SOx);

② an antimicrobial metal such as copper, nickel or silver is captured by a base fiber in the form of a sheet or mat, and the resulting fiber is used as an antimicrobial or microbicidal sheet or mat (e.g., a sole insert for shoes, bedclothes for medical application, a toilet lid or seat cover, toilet base mat or a hand towel), or the resulting fiber is processed into a filter and is used as a cleaning filter for use in, for example, an air conditioning system;

③ an antimicrobial or microbicidal metal is chelate-captured by a powdery fiber, and the resulting fiber is kneaded into, for example, a resin to prepare an antimicrobial or microbicidal plastic;

④ in a cleaning filter for an exhaust gas containing, for example, harmful nitrogen oxides (e.g., an exhaust gas from an underground parking zone or a tunnel of an highway), a metal having oxidation catalytic activity such as titanium or iron is attached by chelation to the fiber, and the resulting fiber is used as a metal chelate fibrous catalyst for rendering the nitrogen oxides harmless;

⑤ copper or nickel, for example, is chelate-captured, and the resulting fiber is used as an electromagnetic shielding material for absorbing harmful electromagnetic waves;

⑥ a colored metal ion such as of copper, cobalt, nickel or iron is chelate-captured by the fiber, and the resulting fiber is used, for example, as a shading material, a colored cloth or ornaments; and ⑦ an essential trace metal for plants such as calcium, magnesium, manganese, iron, copper or zinc is chelate-captued by the fiber, and the resulting fiber is used as a fertilizer.

EXSAMPLES

The present invention will be illustrated with reference to several examples below, which are not intended to limit the scope of the invention. Modifications and variations can be made without departing from the purpose described hereinabove and hereinafter and all such modifications and variations are also included in the technical scope of the present invention.

Example 1

A 0.2 g of ammonium ferrous sulfate hexahydrate was dissolved in 800 ml of distilled water, 20 g of a cotton cloth (an unbleached cotton knit) was immersed in the resulting solution at 20° C. for 15 minutes and was centrifugally dehydrated. Separately, 80 ml of distilled water, 6 g of glycidyl methacrylate, 0.3 g of a nonionic surfactant (produced by Nippon Oils & Fats Corporation under the trade name of "NONION OT-221"), 0.7 g of a 31% aqueous hydrogen peroxide solution, and 0.25 g of thiourea dioxide were mixed and emulsified to prepare a solution, and the cotton cloth after centrifugal dehydration was immersed in and treated with the solution at 60° C. for 2 hours. Next, the treated cotton cloth was rinsed with distilled water, was centrifugally dehydrated and was dried at 60° C. for 16 hours to thereby obtain 24.8 g of cotton cloth having grafted glycidyl methacrylate.

Next, 200 g of iminodiacetic acid was added to 800 g of distilled water, the resulting solution was adjusted to pH 10 with a 50% aqueous sodium hydroxide solution. In this solution, the above-prepared grafted cotton cloth was immersed at 90° C. for 2 hours. Subsequently, the treated cotton cloth was sufficiently rinsed with distilled water, was dehydrated, was immersed in 100 ml of a 5% sulfuric acid at 20° C. for 30 minutes, was sufficiently rinsed with water, was centrifugally dehydrated and was dried at 50° C. for 16 hours to thereby obtain 28.4 g (substitution rate: 42% by mass) of a metal chelate forming fiber (chelate fiber A).

After 1 g of the obtained chelate fiber A was added to and stirred with 1 liter of a 5 mmol/liter aqueous copper sulfate solution at 20° C. for 20 hours, copper capturing capability was evaluated by determining the amount of copper ions remained in the solution. It was found that the chelate fiber A was capable of capturing 1 mmol of copper per gram of the chelate fiber A.

In place of the chelate fiber A, the copper capturing capability was determined separately in the same way except using a commercially available bead-like styrene-iminodiacetic acid chelate resin (produced by Mitsubishi Chemical Corporation under the trade name of "DIAION CR11") as a comparison. As a result it was confirmed that the chelate resin was capable of capturing 0.7 mmol of copper per gram of the chelate resin.

(Adsorption Test Depending on Ph)

A 0.05 g of the chelate fiber A was added to 50 ml of a dilute aqueous sulfuric acid solution containing each about 1 mmol/liter of copper, zinc, nickel and cobalt in which pH was adjusted to a range from 0 to 10, was stirred at 20° C. for 20 hours, and the adsorption of each metal ion was determined, and compared with that of a commercially available chelate resin.

Figure 2:
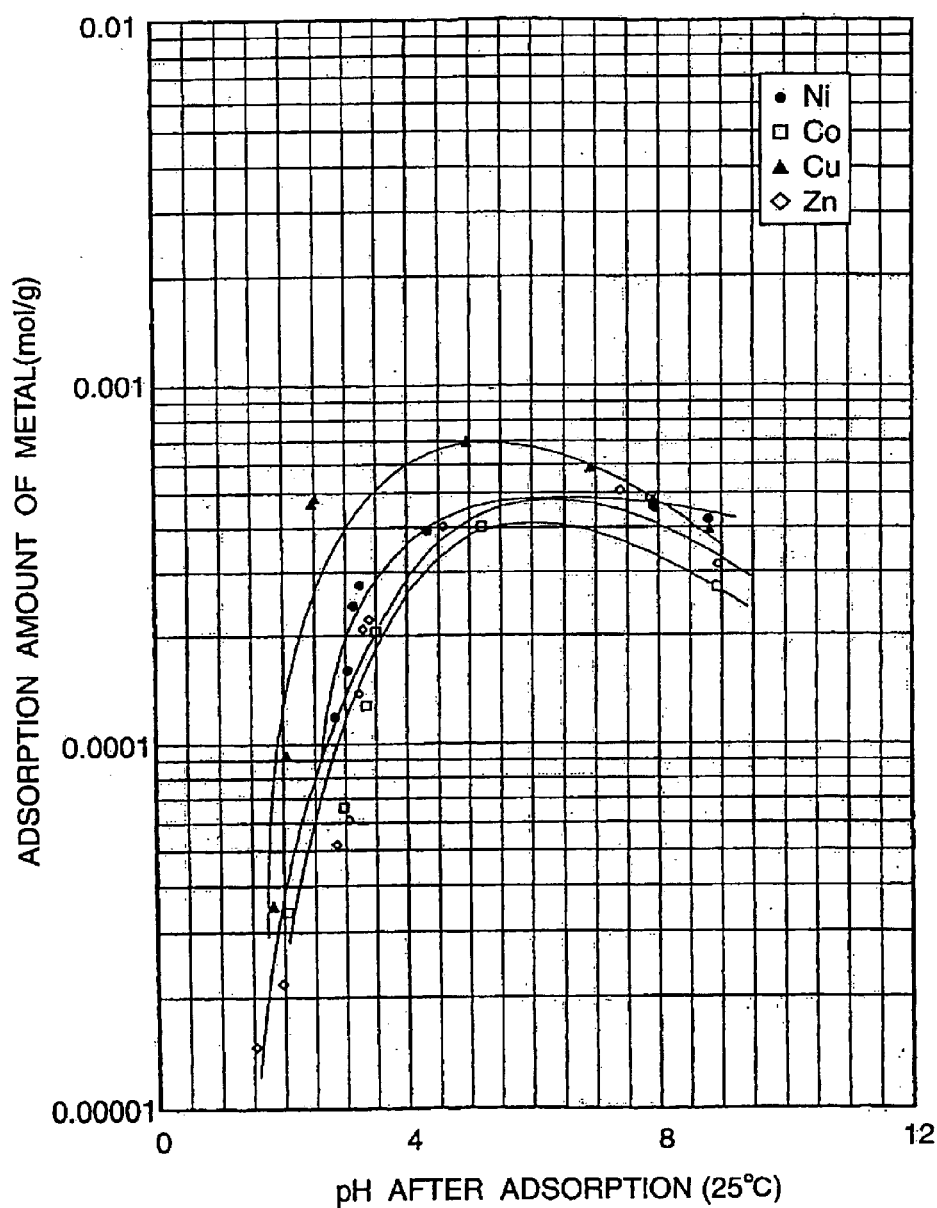
FIG. 2 is a graph showing a relationship between pH of a treated liquid and the adsorption of a variety of metal ions upon the use of a commercially available chelate resin used as a comparative example in Example 1.

FIG. 1 shows the results of the adsorption in the case of using the chelate fiber A, indicating that the chelate fiber A exhibited satisfactory capturing capability to any of metal ions including copper, zinc, nickel and cobalt ions and exhibited high adsorption activity not only around neutral region but also in a low pH region. In contrast, FIG. 2 shows the results of the adsorption using the commercially available chelate resin (produced by Mitsubishi Chemical Corporation under the trade name of "DIAION CR11"), indicating that the commercially available chelate resin exhibited very low adsorption performance to any of the tested metals in a region of pH 2 or below and that it had high pH dependence.

(Copper Ion Adsorption Rate Test)

A copper ion adsorption rate of the chelate fiber A was compared with that of a commercially available bead-like chelate resin (produced by Mitsubishi Chemical Corporation under the trade name of "DIAION CR11"). Each 1 g of the chelate fiber A or the commercially available bead-like chelate resin was added to 1 liter of an aqueous copper sulfate solution having a copper ion concentration of 100 ppm, and a change with time in copper ion concentration of the resulting solution was determined.

Figure 3:
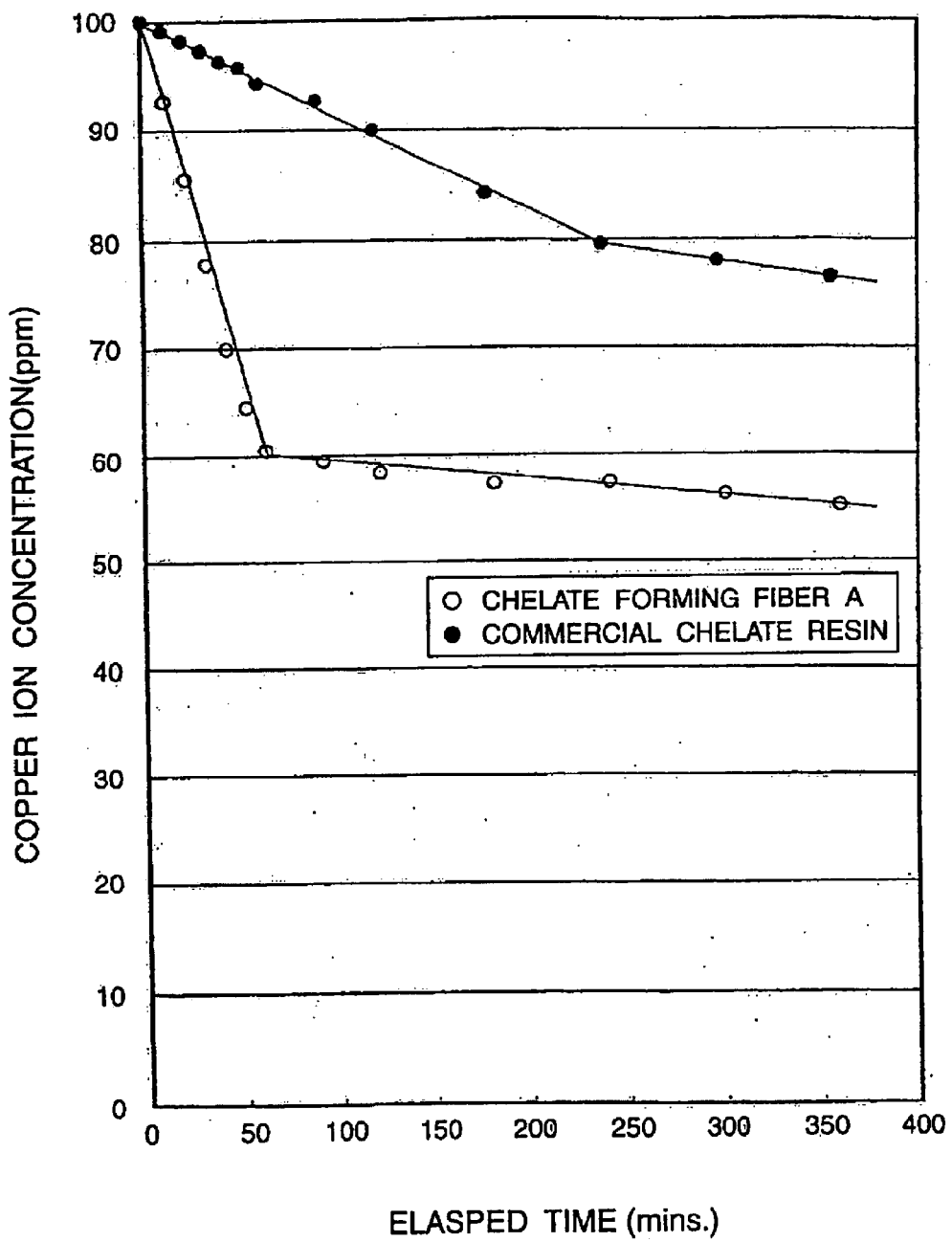
FIG. 3 is a graph showing, as a comparison, a relationship between treatment time and copper ion concentration in a treated liquid when a liquid containing a copper ion is treated with the chelate fiber A obtained in Example 1 and a commercially available bead-like chelate resin.

The results were shown in FIG. 3 and indicating that it took about 4 hours for the captured amount of copper ions to become saturated when the commercially available bead-like chelate resin was used. It took about 1 hour for the captured amount of copper ions to become saturated when the chelate fiber A of the invention was used, indicating that the chelate fiber A of the invention had an adsorption-capturing rate of about four times greater than the commercially available chelate resin.

(Break Through Curve Measurement Test)

Each 1 g of the chelate fiber A or a commercially available bead-like chelate resin (produced by Mitsubishi Chemical Corporation under the trade name of "DIAION CR11") was charged into a glass column of 5 mm in diameter. An aqueous copper sulfate solution having a copper ion concentration of 10 ppm was allowed to pass through the column at a flow rate of $SV=100$ $hr^{-1}$, and a concentration of the copper ion in an effluent was measured to thereby determine a break through curve.

Figure 4:
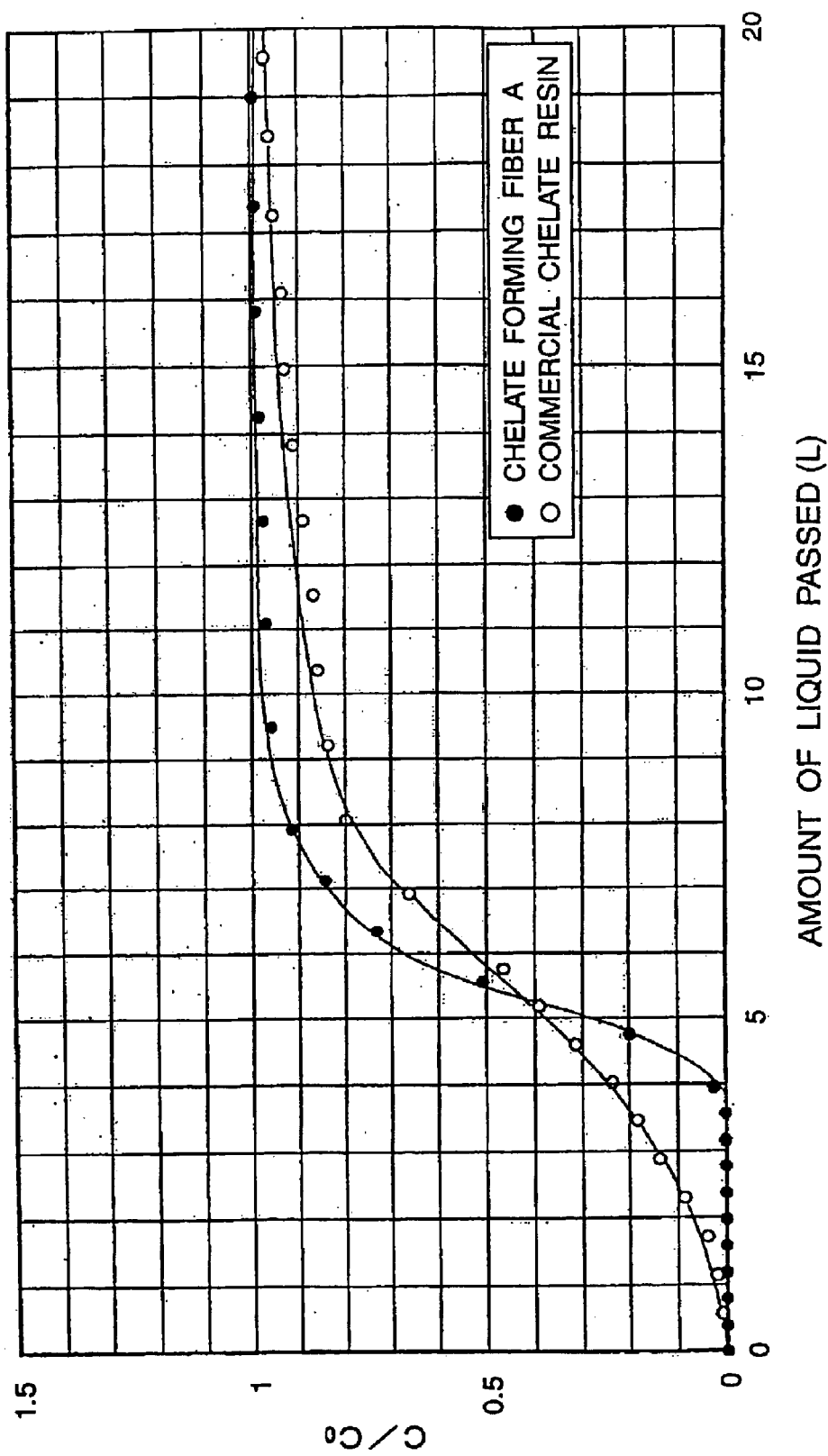
FIG. 4 is a graph showing a relationship between liquid passing amount and copper ion concentration in a treated liquid when a water containing a copper ion is treated with the chelate fiber A obtained in Example 1 or a commercially available bead-like chelate resin.

The results as shown in FIG. 4 show that the copper ion run out before it was sufficiently captured when the commercially available chelate resin was used and that the chelate fiber A of the invention could nearly fully capture the metal before the capturing capability of metal of the chelate fiber became saturated. These results also indicate that the chelate fiber of the invention is capable of excellently capturing metal ions.

Example 2

The chelate-forming fiber was prepared in the same way of Example 1 except that 20 g of a powdery cellulose (produced by Nippon Paper Industries Co., Ltd. under the trade name of "KC FLOCK W-100") was used instead of the cotton cloth (unbleached cotton knit). As a result, 30.0 g (substitution rate: 50% by mass) of a metal chelate-forming fiber (chelate fiber B) was obtained. The obtained chelate fiber B was subjected to adsorption test in the same manner as above. It was confirmed that the chelate fiber B was capable of capturing 1.2 mmol of copper per gram of the chelate fiber B.

Example 3

A commercially available cartridge filter (produced by Advantec Toyo Kaisha, Ltd. under the trade name of "TCW-1-CSS", nominal pore size: 1 $\mu$m), which was produced by winding a cotton spun yarn around a stainless steel core in a twill pattern, was mounted to a polypropylene housing (produced by Advantec Toyo Kaisha, Ltd. under the trade name of "1PP-1-FS-000"). Separately, 2.5 g of ammonium ferrous sulfate was dissolved in 10 liters of distilled water, and the resulting solution was circulated through the filter at a flow rate of 15 liter/minute at 20° C. for 15 minutes using a circulating pump, was drained, and the filter was cleaned by circulating 5 liters of distilled water in the same manner.

Next, 60 g of glycidyl methacrylate, 3.0 g of a nonionic surfactant (produced by Nippon Oils & Fats Corporation under the trade name of "NONION OT-221"), 6.5 g of a 31% aqueous hydrogen peroxide solution and 2.5 g of thiourea dioxide were dissolved in 8 liters of distilled water, the resulting solution was circulated through the filter in the same manner at 60° C. for 2 hours to thereby graft glycidyl methacrylate to the molecule of the cotton spun yarn, and then the resulting reaction mixture was drained, and the cartridge filter was cleaned by circulating 3 liters of distilled water.

Next, 1 kg of iminodiacetic acid was added to 4 liters of distilled water, the resulting solution was adjusted to pH 10 with a 50% aqueous sodium hydroxide solution, the resulting solution was circulated through the filter containing the grafted glycidyl methacrylate at 80° C. for 2 hours, drainage and cleaning operations were repeated, 5 liters of a 5% sulfuric acid was circulated through the filter, and circulation and drainage operations were repeated using distilled water until washings became neutral to thereby obtain a metal chelate forming filter (chelate fiber C).

This metal chelate forming filter was mounted onto the polypropylene housing. Separately, copper sulfate was dissolved in distilled water to obtain a solution with a copper ion concentration of 10 ppm, and 3.05 g of a fine silicon dioxide powder having a mean particle size of 10 µm was dispersed in this solution as an insoluble impurity to thereby obtain a test solution. The test solution was circulated through the above-prepared filter at a flow rate of 15 liter/minute at 25° C. for 1 hour.

Subsequently, a copper ion concentration of the test solution was determined. It was confirmed that the copper ion concentration was decreased less than or equal to 1 ppm. A 1 liter of the test solution was passed through a membrane filter having a pore size of 0.1 µm, and the amount of remained silicon dioxide was measured to determine the removing ratio of silicon dioxide. It was found that a removing ratio of silicon dioxide was 97.5%, indicating that the filter is capable of concurrently removing metal ions and insoluble impurities.

Example 4

The chelate-forming fiber was prepared in the same way of Example 1 except that 800 g of a 30% aqueous trisodium ethylenediaminetriacetate was used instead of the aqueous iminodiacetic acid solution, to thereby obtain 27.3 g (substitution rate: 36.5% by mass) of a metal chelate forming fiber (chelate fiber D). The obtained chelate fiber D was subjected to the adsorption test in the same manner as above. It was confirmed that the chelate fiber D was capable of capturing 1.0 mmol of copper per gram of the chelate fiber D.

Example 5

A cotton cloth onto which glycidyl methacrylate was grafted was obtained in the same manner as in Example 1, and 25 g of this cotton cloth was immersed in 1 liter of thioglycolic acid, was heated at 80° C. for 2 hours, was rinsed with distilled water until washings became neutral and was then dried at 40° C. for 20 hours to thereby obtain 27.4 g (substitution rate: 37% by mass) of a metal chelate forming fiber (chelate fiber E). The obtained chelate fiber E was subjected to the adsorption test in the same manner as above. It was confirmed that the chelate fiber E was capable of capturing 1.1 mmol of copper per gram of the chelate fiber E.

Example 6

The chelate-forming fiber was prepared in the same way of Example 1 except that 20 g of a rayon cloth (a rayon taffeta) was used instead of the cotton cloth (unbleached cotton knit), to thereby obtain 30.9 g (substitution rate: 54.5% by mass) of a metal chelate-forming fiber (chelate fiber F).

The obtained chelate fiber F was subjected to the adsorption test in the same manner as above, and it was confirmed that the chelate fiber F was capable of capturing 1.3 mmol of copper per gram of the chelate fiber F.

INDUSTRIAL APPLICABILITY

The metal chelate-forming fiber of the invention is configured as above, has a high capacity of capturing metal ions, exhibits a markedly satisfactory capturing rate, can very efficiently capture and remove metal ions from water before or after use, oils or gasses (including, for example, exhaust gases) and can very efficiently clean these substances, as compared with conventional ion exchange resins and chelate resins.

Additionally, when the metal chelate forming fiber of the invention captures a metal ion, it can easily desorb the metal ion by a treatment with an aqueous solution of an acid such as a mineral acid or organic acid. Consequently, the metal chelate forming fiber can be easily regenerated, reused and can also be used for concentrating and obtaining a metal component.

The use of a powdery fiber as a base fiber allows the resulting fiber to concurrently have capability of removing metal ions and performance as a filter aid. Additionally, the use of a fiber material in the form of a filter allows the resulting filter to have purification activity including both capability of capturing metal ions and capability of removing insoluble impurities.

When the fiber of the invention becomes unnecessary and is discarded, it is expected that the fiber of the invention is subject to the biodegradation and avoids the generation of a harmful gas upon incineration, since the fiber of comprises a natural or regenerated fiber as a base.

Additionally, when the process of the invention is employed, a high performance fiber capable of capturing metal ions can be safely and easily obtained by such a simple manner as heating treatment in water or another conventional solvent without an extra or special apparatus or treatment such as ionizing radiation.

Furthermore, when a metal ion to be chelate-captured is intentionally selected, characteristics of the metal itself such as catalytic activity or antimicrobial or microbicidal activity can be imparted to the fiber as a metal chelate fiber. The resulting metal chelate fiber can be extensively and effectively used, for example, as a filter-shaped catalyst for exhaust gas treatment, antimicrobial or microbicidal sheet material or a filter material for an air conditioning system.

What is claimed is:

1. A metal chelate-forming fiber comprising at least one metal chelate forming compound selected from the group consisting of aminocarboxylic acid, aminodicarboxylic acids, thiocarboxylic acid and phosphoric acid which are reactive to an epoxy group, is bonded to a fiber molecule of a natural fiber or regenerated fiber through a graft reaction product of a crosslinkable compound which has a reactive double bond and a glycidyl group in its molecule; and wherein said metal chelate-forming fiber includes a metal chelate forming moiety having a hydroxyl group and an oxygen atom adjacent to a carbonyl group.

2. The metal chelate-forming fiber according to claim 1, wherein said crosslinkable compound is at least one selected from the group consisting of glycidyl methacrylate, glycidyl acrylate and allyl glycidyl ether.

3. The metal chelate-forming fiber according to claim 1, wherein said metal chelate forming compound is at least one selected from the group consisting of iminodiacetic acid, ethylenediaminediacetic acid, ethylenediaminetriacetic acid, thioglycolic acid, thiomalic acid and phosphoric acid.

4. The metal chelate-forming fiber according to claim 3, wherein said metal chelate forming compound is iminodiacetic acid, ehylenediaminetriacetic acid or thioglycolic acid.

5. The metal chelate forming fiber according to claim 1, wherein said natural or regenerated fiber is a vegetable fiber.

6. The metal chelate-forming fiber according to claim 5, wherein said vegetable fiber is a cellulosic fiber.

7. The metal chelate-forming fiber according to claim 1, wherein said natural fiber is an animal fiber.

8. The metal chelate-forming fiber according to claim 1, wherein said fiber is powdery.

9. The metal chelate-forming fiber according to claim 1, wherein said fiber is a filter material.

10. A process for producing a metal chelate-forming fiber, comprising the steps of:

subjecting a crosslinkable compound having a reactive double bond and a glycidyl group in its molecule to graft reaction with a fiber molecule of a natural or regenerated fiber using a redox catalyst; and allowing the resulting graft reaction product to be bonded with at least one metal chelate-forming compound selected from the group consisting of aminocarboxylic acid, aminodicarboxylic acids, thiocarboxylic acids and phosphoric acid which are reactive with an epoxy group, to form a metal chelate forming moiety having a hydroxyl group and an oxygen atom adjacent to a carbonyl group.

11. The process according to claim 10, wherein said crosslinkable compound is at least one selected from the group consisting of glycidyl methacrylate, glycidyl acrylate and allyl glycidyl ether.

12. The process according to claim 10, wherein said metal chelate forming compound is at least one selected from the group consisting of iminodiacetic acid, ethylenediaminediacetic acid, ethylenediaminetriacetic acid, thioglycolic acid, thiomalic acid and phosphoric acid.

13. The process according to claim 10, wherein said redox catalyst is a combination of a divalent iron salt, hydrogen peroxide and thiourea dioxide.

14. The process according to claim 13, wherein the natural or regenerated fiber is previously treated with the divalent iron salt and is then applied with the hydrogen peroxide and thiourea dioxide to thereby perform the graft reaction.

15. A method of capturing metal ions, comprising the steps of:

providing a metal chelate-forming fiber comprising at least one metal chelate-forming compound selected from the group consisting of aminocarboxylic acid, aminodicarboxylic acids, thiocarboxylic acid and phosphoric acid bonded to a fiber molecule of a natural fiber or regenerated fiber through a graft reaction product of a crosslinkable compound which has a reactive double bond and a glycidyl group in its molecule, wherein the metal chelate-forming fiber includes a metal chelate forming moiety having a hydroxyl group and an oxygen atom adjacent to a carbonyl group; and bringing the metal chelate-forming fiber into contact with an aqueous liquid containing metal ions to thereby capture the metal ions from the aqueous liquid.

16. A method of capturing metal ions, comprising the steps of:

providing a metal chelate-forming fiber comprising at least one metal chelate-forming compound selected from the group consisting of aminocarboxylic acid, aminodicarboxylic acids, thiocarboxylic acid and phosphoric acid bonded to a fiber molecule of a natural fiber or regenerated fiber through a graft reaction product of a crosslinkable compound which has a reactive double bond and a glycidyl group in its molecule, wherein the metal chelate-forming fiber includes a metal chelate forming moiety having a hydroxyl group and an oxygen atom adjacent to a carbonyl group; and bringing the metal chelate-forming fiber into contact with an oily liquid containing metal ions to thereby capture the metal ions from the oily liquid.

17. A method of capturing metal ions, comprising the steps of:

providing a metal chelate-forming fiber comprising at least one metal chelate-forming compound selected from the group consisting of aminocarboxylic acid, aminodicarboxylic acids, thiocarboxylic acid and phosphoric acid bonded to a fiber molecule of a natural fiber or regenerated fiber through a graft reaction product of a crosslinkable compound which has a reactive double bond and a glycidyl group in its molecule, wherein the metal chelate-forming fiber includes a metal chelate forming moiety having a hydroxyl group and an oxygen atom adjacent to a carbonyl group; and bringing the metal chelate-forming fiber into contact with a gas containing metal ions to thereby capture the metal ions from the gas.

18. A metal chelate fiber comprising a metal is bonded by chelation to the metal chelate-forming fiber comprising at least one metal chelate-forming compound selected from the group consisting of aminodicarboxylic acids, thiocarboxylic acid and phosphoric acid which are reactive to an epoxy group, is bonded to a fiber molecule of a natural fiber or regenerated fiber through a graft reaction product of a crosslinkable compound which has a reactive double bond and a glycidyl group in its molecule; and wherein said metal chelate-forming fiber includes a metal chelate forming moiety having a hydroxyl group and an oxygen atom adjacent to a carbonyl group.

* * * * *